United States Patent
Davis et al.

(10) Patent No.: US 8,922,329 B2
(45) Date of Patent: Dec. 30, 2014

(54) BATTERY CHARGING TO EXTEND BATTERY LIFE AND IMPROVE EFFICIENCY

(75) Inventors: Roy H. Davis, San Diego, CA (US); Babak Forutanpour, San Diego, CA (US); Ronen R. Stern, San Diego, CA (US); Brian Momeyer, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1060 days.

(21) Appl. No.: 12/783,441

(22) Filed: May 19, 2010

(65) Prior Publication Data

US 2011/0018679 A1    Jan. 27, 2011

Related U.S. Application Data

(60) Provisional application No. 61/227,936, filed on Jul. 23, 2009, provisional application No. 61/236,817, filed on Aug. 25, 2009.

(51) Int. Cl.
| | |
|---|---|
| G05B 23/02 | (2006.01) |
| H02J 7/00 | (2006.01) |
| H02J 7/04 | (2006.01) |
| G01R 31/36 | (2006.01) |
| H02J 7/02 | (2006.01) |
| H04M 1/02 | (2006.01) |
| H04B 5/00 | (2006.01) |

(52) U.S. Cl.
CPC ............ *H02J 7/025* (2013.01); *H04M 1/0202* (2013.01); *H02J 7/041* (2013.01); *H04B 5/0037* (2013.01)
USPC ......... 340/3.1; 340/5.1; 340/7.32; 455/550.1; 455/41.1; 320/114; 320/160; 320/108

(58) Field of Classification Search
CPC .................................................... G05B 23/02
USPC ......... 340/3.1; 320/160, 108, 155; 455/550.1, 455/41.1; 702/63
See application file for complete search history.

(56) References Cited

U.S. PATENT DOCUMENTS

| | | | |
|---|---|---|---|
| 6,184,651 B1* | 2/2001 | Fernandez et al. ............ | 320/108 |
| 6,184,654 B1* | 2/2001 | Bachner et al. ............... | 320/114 |

(Continued)

FOREIGN PATENT DOCUMENTS

| | | |
|---|---|---|
| CN | 1107619 A | 8/1995 |
| CN | 1175876 A | 3/1998 |

(Continued)

OTHER PUBLICATIONS

International Search Report and Written Opinion—PCT/US2010/043154, International Search Authority—European Patent Office—Mar. 18, 2011.

(Continued)

*Primary Examiner* — Nam V Nguyen
(74) *Attorney, Agent, or Firm* — Knobbe, Martens, Olson & Bear, LLP

(57) ABSTRACT

Exemplary charging device includes a processor and charging current for coupling to a battery. In an exemplary embodiment, the processor defines charging profiles for charging the battery at different charge rates. A profile can be selected based on a determinable time event and may be modified based on a charging history. Adjustable charging power is supplied to the battery at a power level, a charging duration, or a combination thereof based on the selected profile. A wireless power transmitter can also define charging profiles and charging histories for receivers that receive power from the transmitter based on an identifier from the receiver. The transmitter can select the charging profile based on a determinable time event and may be modified based on a charging history. The transmitter supplies power through the wireless power link at a power level, a charging duration, or a combination thereof based on the selected profile.

32 Claims, 10 Drawing Sheets

(56) References Cited

U.S. PATENT DOCUMENTS

| | | | |
|---|---|---|---|
| 6,337,560 B1 * | 1/2002 | Kalogeropoulos et al. | 320/160 |
| 6,353,306 B1 * | 3/2002 | Mixon | 320/160 |
| 7,191,077 B2 * | 3/2007 | Mese et al. | 702/63 |
| 7,282,891 B2 * | 10/2007 | Smallwood et al. | 320/137 |
| 7,375,493 B2 * | 5/2008 | Calhoon et al. | 320/108 |
| 7,518,340 B2 * | 4/2009 | Sterz et al. | 320/132 |
| 7,570,015 B2 * | 8/2009 | Bansal et al. | 320/106 |
| 8,004,235 B2 * | 8/2011 | Baarman et al. | 320/108 |
| 8,155,710 B2 * | 4/2012 | Harris | 455/573 |
| 8,183,827 B2 * | 5/2012 | Lyon | 320/108 |
| 8,212,518 B2 * | 7/2012 | Pijnenburg et al. | 320/108 |
| 2001/0012281 A1 | 8/2001 | Hall et al. | |
| 2004/0067412 A1 | 4/2004 | Shimizu et al. | |
| 2005/0017684 A1 * | 1/2005 | Brecht | 320/131 |
| 2005/0068019 A1 | 3/2005 | Nakamura et al. | |
| 2005/0127868 A1 | 6/2005 | Calhoon et al. | |
| 2005/0134225 A1 | 6/2005 | Mese et al. | |
| 2006/0135217 A1 | 6/2006 | Sung et al. | |
| 2006/0226807 A1 | 10/2006 | Simpson et al. | |
| 2006/0280519 A1 | 12/2006 | Mori et al. | |
| 2007/0236180 A1 | 10/2007 | Rodgers | |
| 2007/0298776 A1 | 12/2007 | Arlene | |
| 2008/0248834 A1 | 10/2008 | Chatterjee et al. | |
| 2009/0011706 A1 | 1/2009 | Wilson et al. | |
| 2009/0170552 A1 | 7/2009 | Lin | |
| 2009/0284082 A1 | 11/2009 | Mohammadian | |

FOREIGN PATENT DOCUMENTS

| | | |
|---|---|---|
| EP | 0986034 A2 | 3/2000 |
| EP | 1170618 A2 | 1/2002 |
| EP | 1667308 A2 | 6/2006 |
| EP | 2079146 A2 | 7/2009 |
| EP | 2093860 A1 | 8/2009 |
| FR | 2865602 A1 | 7/2005 |
| GB | 2315933 A | 2/1998 |
| JP | H10210677 A | 8/1998 |
| JP | 2002359008 A | 12/2002 |
| WO | WO2008072628 A1 | 6/2008 |
| WO | WO2009012018 A2 | 1/2009 |
| WO | WO2009050624 A2 | 4/2009 |
| WO | WO2010057224 A1 | 5/2010 |

OTHER PUBLICATIONS

Partial International Search Report—PCT/US2010/043154—International Search Authority, European Patent Office, Dec. 1, 2010.

* cited by examiner

BATTERY CHARGING TO EXTEND BATTERY LIFE AND IMPROVE EFFICIENCY

CLAIM OF PRIORITY UNDER 35 U.S.C. §119

This application claims priority under 35 U.S.C. §119(e) to:

U.S. Provisional Patent Application 61/227,936 entitled "HISTORY BASED WIRELESS BATTERY CHARGING TO EXTEND BATTERY LIFE AND IMPROVE EFFICIENCY" filed on Jul. 23, 2009, the disclosure of which is hereby incorporated by reference in its entirety.

U.S. Provisional Patent Application 61/236,817 entitled "WIRELESS CHARGER, PORTABLE ELECTRONICS AND BATTERY" filed on Aug. 25, 2009, the disclosure of which is hereby incorporated by reference in its entirety.

BACKGROUND

1. Field

The present invention relates generally to wireless charging, and more specifically to devices, systems, and methods related to allocating power to receiver devices that may be located in wireless power systems.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area.

For many wireless charging systems, the power transmitted from the source is fixed to a single level, thus the power level generally cannot be adjusted to accommodate devices with different maximum peak power levels. This limits the types of devices that can be charged. Another problem is that fixed radiated power levels cannot be adjusted as a function of the device's current battery level. This wastes power since as the battery charges it needs less and less power to complete the charge.

With portable electronic devices, most battery chargers use a compromise charging profile. It is a compromise between rapid charging, because the user's needs are unknown, and slow charging that is friendlier to the battery. Furthermore, batteries tend to exhibit varying charging profiles with repeated charging. Conventional wired chargers tend to be plugged and unplugged from power and retain no sense of charging history for a battery. However, a portable electronic device, such as a cell phone, may retain some charging history for the battery, but any retained history has been conventionally limited to controlling the termination of charging.

There is a need for apparatuses and methods that can adapt to different battery charging needs based on potential usage of a portable electronic device, actual usage of the portable electronic device, or a combination thereof. Furthermore, there is a need for wireless power delivery to such devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Exemplary embodiments of the invention described herein include apparatuses and methods that can adapt to different battery charging needs based on potential usage of a battery powered device, actual usage of the battery powered device, or a combination thereof. Furthermore, some exemplary embodiments include wireless power delivery to such devices.

Figure 1:
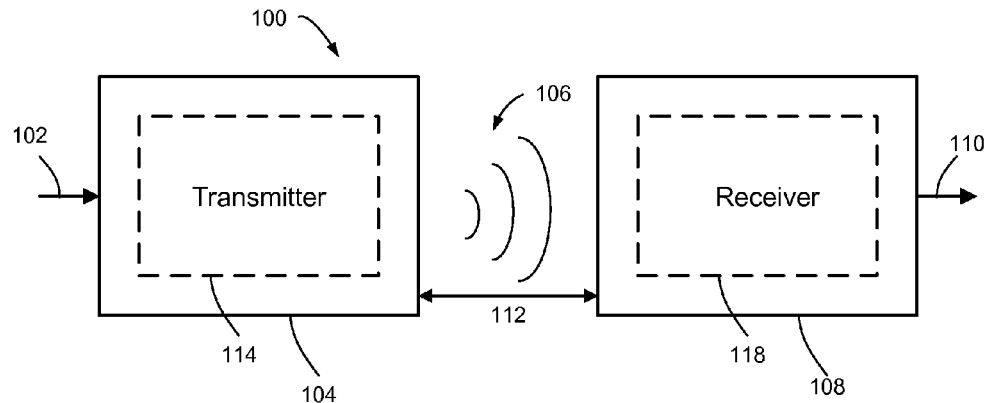
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
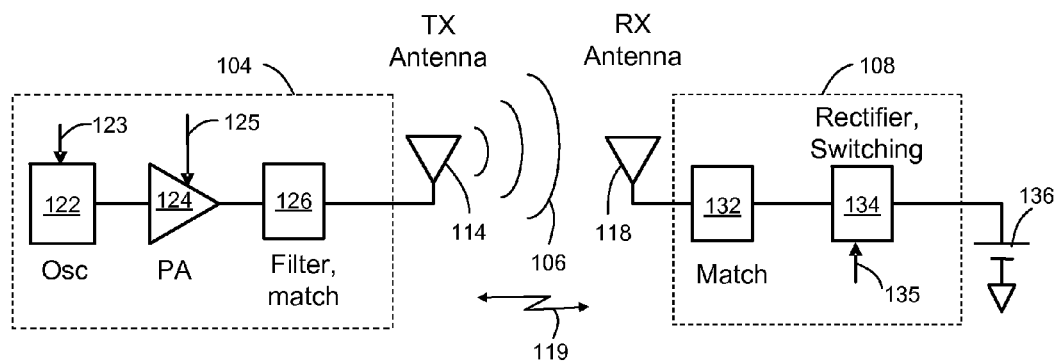
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
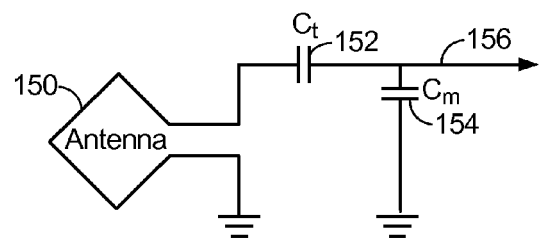
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the disclosure include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the disclosure, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >40%) to a small Rx antenna at significantly larger distances than allowed by far field and inductive approaches mentioned earlier. If the Tx antenna is sized correctly, high coupling levels (e.g., 40% to 70%) can be achieved when the Rx antenna on a host device is placed within a coupling-mode region (i.e., in the near-field) of the driven Tx loop antenna.

Figure 4:
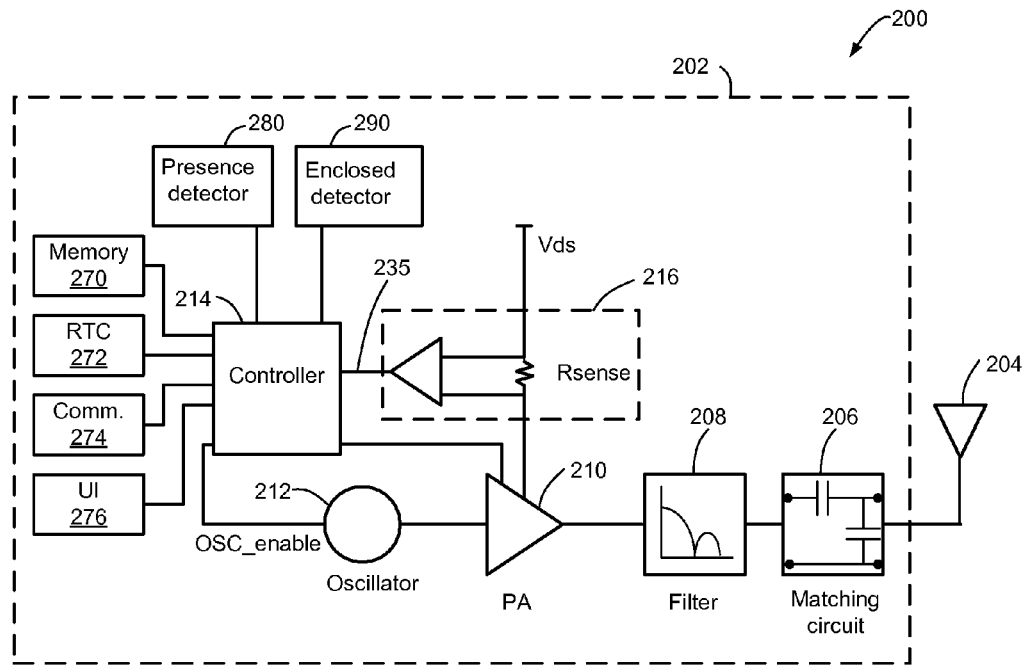
FIG. 4 is a simplified block diagram of a transmitter, in accordance with an exemplary embodiment of the present invention.

FIG. 4 is a simplified block diagram of a transmitter 200 (also referred to herein as a wireless power transmitter), in accordance with an exemplary embodiment of the present disclosure. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes an impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, by creating a voltage drop across a resistor ($R_{sense}$), which is affected by the presence or absence of active receivers in the vicinity of the near-field generated by transmit antenna 204. Detection of changes to the loading on the power amplifier 210 are generated at a comparator output 235 and monitored by the controller 214 for use in determining whether to enable the oscillator 212 for transmitting energy to communicate with an active receiver. In other words, the comparator output 235 can indicate presence or absence of receive antennas in the near field of the transmit antenna as well as detect communications from the receive antennas based on fluctuations in the comparator output 235, as explained more fully below.

The transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., a fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the receive device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

The transmit circuitry 202 may include a memory 270 for storing, as non-limiting examples, software for the controller, information about the transmitter 200, information about transmit operations, and information about receivers that are placed in the vicinity of the transmitter 200, communicate with the transmitter 200, or combinations thereof.

The transmit circuitry 202 may include a Real-Time Clock (RTC) 272 configured to track a determinable time event, a non-limiting example of which may be a time of day. The real time clock may be updated from a number of sources, such as, for example, user input from a user interface 276 and communications from external devices through a communication element 274.

The user interface 276 may include input elements, such as, for example, keyboards, mice, joysticks, and the like for enabling the user to input information to the user interface 276. The user interface 276 may also include output elements, such as, for example audio generators and visual displays for communicating information to the user.

The communication element 274 may include circuitry for communicating with a remote device (not shown) through a variety of wired, and wireless communication interfaces, such as cellular signals, wireless network signals, and wired network signals, serial channels, and parallel channels. The communication element 274 may communicate with an external device (not shown) or an external data network (not shown). As a non-limiting example, the external data network may be the Internet and a Web page (or other graphical interface) may be used for the user to transmit and receive information to and from the transmitter 200. In addition, the communication element 274 can also be considered to include the load sensing circuit 216, which may be used to communicate between a receiver and the transmitter 200 using the near field radiation.

Figure 5:
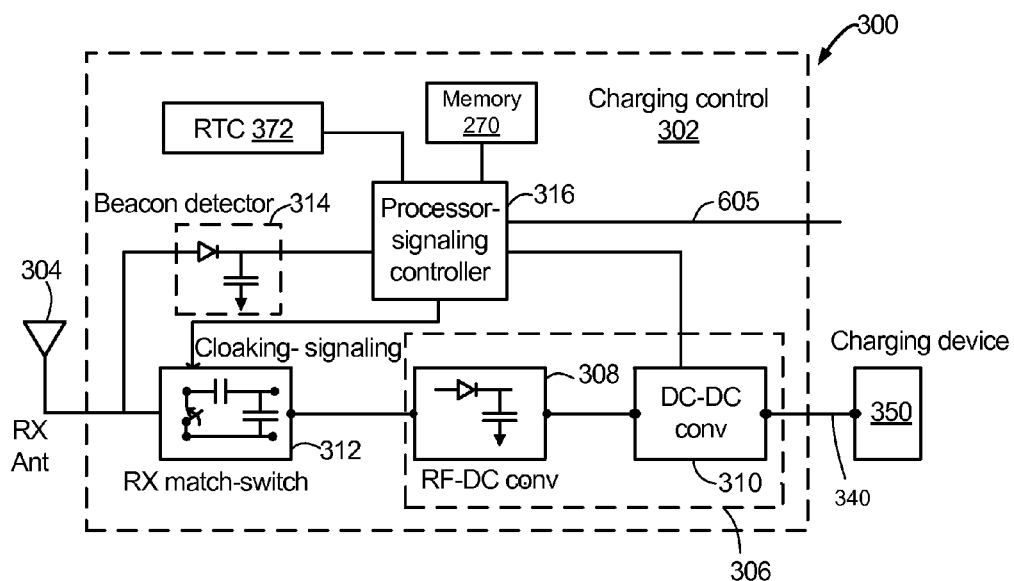
FIG. 5 is a simplified block diagram of a receiver, in accordance with an exemplary embodiment of the present invention.

FIG. 5 is a simplified block diagram of a receiver 300, in accordance with an exemplary embodiment of the present disclosure. The receiver 300 includes receive circuitry 302 and a receive antenna 304. Receiver 300 further couples to device 350 with a charging power line 340 for providing received power to the device 350 as a charging current. It should be noted that receiver 300 is illustrated as being external to device 350 but may be integrated into device 350. Generally, energy is propagated wirelessly to receive antenna 304 and then coupled through receive circuitry 302 to device 350. Device 350 may include the battery 690 of FIG. 6 to be charged as described herein.

The receive antenna 304 is tuned to resonate at the same frequency, or near the same frequency, as the transmit antenna 204 (FIG. 4). The receive antenna 304 may be similarly dimensioned with the transmit antenna 204 or may be differently sized based upon the dimensions of the associated device 350. By way of example, device 350 may be a battery powered device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

The receive circuitry 302 provides an impedance match to the receive antenna 304. The receive circuitry 302 includes power conversion circuitry 306 for converting a received RF energy source into charging power line 340 for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver using the near-field refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of the receiver 300 may also occur upon the occurrence of other events including detection of an external wired charging source (e.g., wall/USB power) providing charging power to device 350. The processor 316, in addition to controlling the cloaking of the receiver, may also monitor beacon circuitry 314 to determine a beacon state and extract messages sent from the transmitter. The processor 316 may also adjust DC-to-DC converter 310 for improved performance. The processor 316 may also determine charging profiles for the device 350 and track device charging history, as is explained more fully below.

In some exemplary embodiments, the receive circuitry 320 may signal a power requirement, as explained more fully below to a transmitter in the form of, for example, desired charge start times, desired charge durations, desired charge end times, desired power level, maximum power level, desired current level, maximum current level, desired voltage level, and maximum voltage level. Based on these levels, and the actual amount of power received from the transmitter, the processor 316 may adjust the operation of the DC-DC converter 310 to regulate its output in the form of adjusting the current level, adjusting the voltage level, or a combination thereof.

The receive circuitry 302 may include a memory 370 for storing, as non-limiting examples, software for the processor 316, information about the receiver 300, information about wireless power receive operations, information about battery charging profiles, and information about battery charging history.

The receive circuitry 302 may include a Real-Time Clock (RTC) 372 configured to track a determinable time event such as a time of day. The real time clock may be updated from a number of sources, such as, for example, a transmitter 200 and a communication bus 605 connected to the charging device 350 or other devices.

Figure 6A:
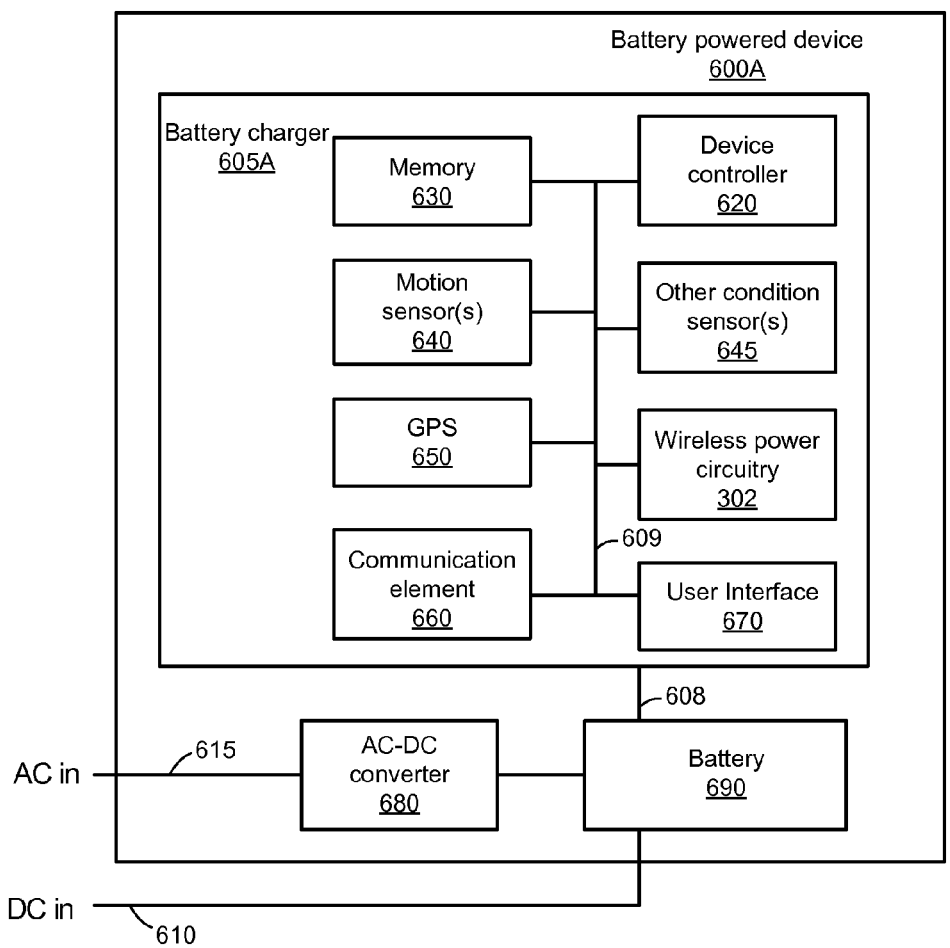
FIGS. 6A and 6B are a simplified block diagrams of battery powered devices with a battery that can be charged with exemplary embodiments of the present invention.
Figure 6B:
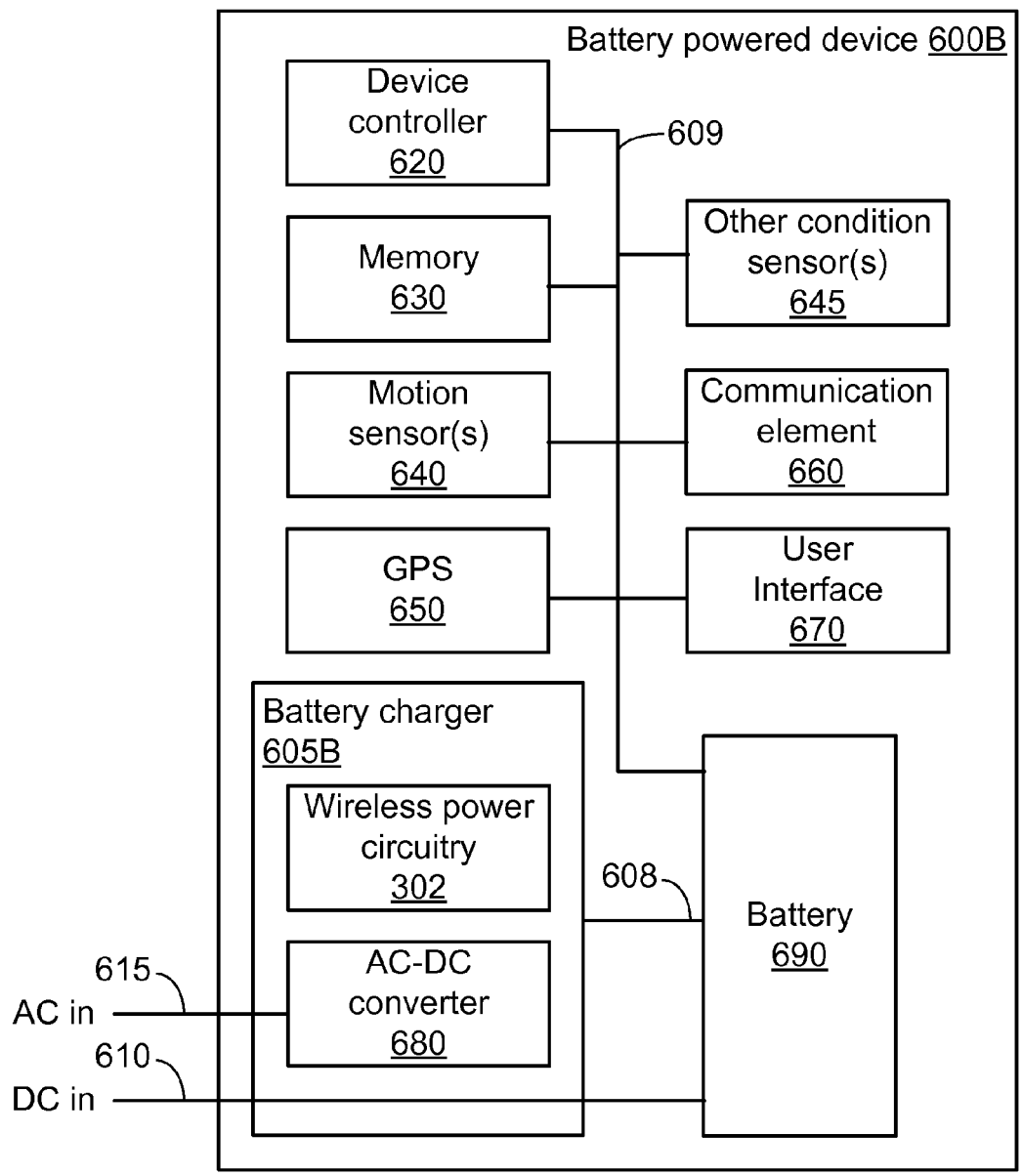

FIGS. 6A and 6B are a simplified block diagrams of battery powered devices with a battery that can be charged with exemplary embodiments of the present invention.

In FIG. 6A, a battery charger 605A (also referred to herein as a battery charging device) provides charging power on charging power line 608 to the battery 690. The battery powered device 600 may be any number of devices, such as, for example, a cellular phone, a smart phone, a personal digital assistant, a portable computer, a portable media player, or an electronic book.

A device controller 620 (also referred to herein as a processor) may be included in the battery charger 600 to control functions and manage information of the battery charger 600.

The battery powered device 600 may include wireless power receive circuitry 302 for providing wireless power to the battery 690, and the battery powered device, as explained above. A DC input 610 may also provide power to the battery powered device 600, to charge the battery 690, or a combination thereof. Similarly, an AC input 615 and an AC-DC converter 680 may be included to provide power to the battery powered device 600, to charge the battery 690, or a combination thereof.

The battery powered device 600 may include a memory 630 for storing, as non-limiting examples, software for the processor 620, information about the battery powered device 600, information about wireless power receive operations, information about battery charging profiles, and information about battery charging history.

One or more motion sensors 640 may be included to provide motion information that indicates how the battery powered device 600 is moving, as is known in the art. As non-limiting examples, the motion sensors 640 may include devices such as accelerometers, gyroscopes, and compasses. A Global Positioning Satellite (GPS) receiver 650 may be included to provide information about where the battery powered device 600 is located, as is known in the art. Furthermore, one or more other condition sensors 645, an example of which is an ambient light detector, may also be included to provide condition information that indicates the battery powered device 600 is in a condition conducive for performing maintenance tasks as further described herein. An ambient light detector could be configured to sense a sub-threshold ambient light condition (e.g., <20 lux) indicating user inactivity such as during sleeping in a darkened space.

One or more user interfaces 670 may include input elements, such as, for example, keyboards, mice, joysticks, and the like for enabling the user to input information to the transmitter 276. The user interface 276 may also include output elements, such as, for example audio generators and visual displays for communicating information to the user.

One or more communication elements 660 may include circuitry for communicating with a remote device (not shown) through a variety of wired, and wireless communication interfaces, such as cellular signals, wireless network signals, and wired network signals, serial channels, and parallel channels. The communication elements 660 may communicate with an external device (not shown) or an external data network (not shown). As a non-limiting example, the external data network may be the Internet and a Web page (or other graphical interface) may be used for the user to transmit and receive information to and from the battery powered device 600. In addition, the communication element 660 can also be considered to include the communications received and transmitted through the wireless power receive circuitry 302 using communication with the near-field radiation, as discussed above.

A communication bus 609 is shown to illustrate that many of the various functional blocks may communicate. However, a person of ordinary skill in the art will recognize that this communication bus 609 is merely to illustrate the possibility of communication and there may be other communication busses between the various functional blocks.

In FIG. 6B, the functional blocks perform substantially the same functions as in FIG. 6A and details thereof need not be described again. In the exemplary embodiment of FIG. 6B, the wireless power circuitry 302 and the AC-DC converter 680 may be part of the battery charger 605B and the other elements may be part of the battery powered device 600B. In addition, in some exemplary embodiments the battery charger (605A and 605B) may be integrated into the battery powered device (600A and 600B). Other exemplary embodiments may be configured with a battery charger (605A and 605B) that may be physically separate from the battery powered device (600A and 600B).

Figure 7:
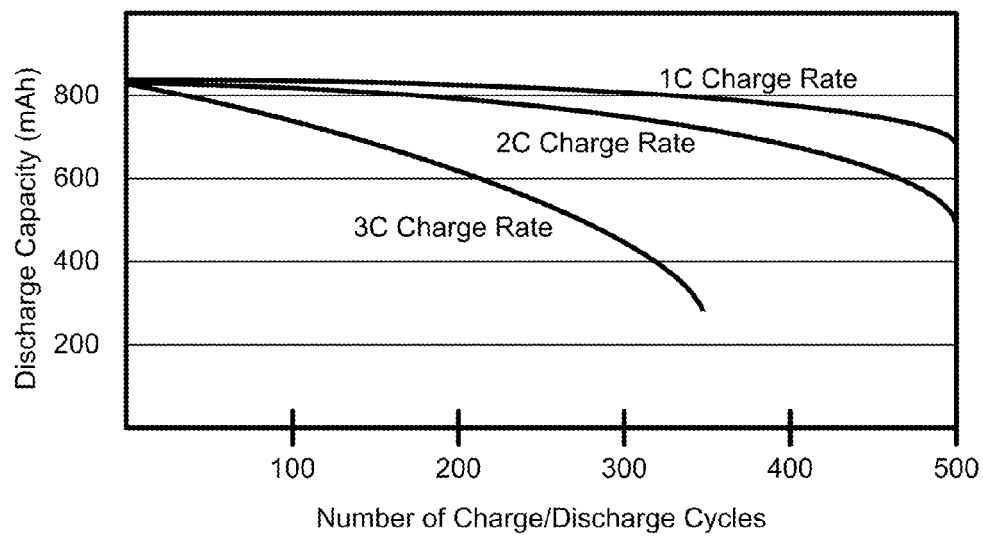
FIG. 7 is a graph indicating various exemplary charge rates for a battery.

FIG. 7 is a graph indicating various exemplary charge rates for a battery (e.g., 690 in FIG. 6). As a non-limiting example, battery performance for a cellular phone is shown with different charging currents. In this case, the battery is rated at 850 milliamp/hours, meaning it can supply a current of 850 milliamps for one hour before the terminal voltage drops to an unacceptable level. When this battery is charged at a 1C rate (C is capacity, 850 mA in this case) the battery would have a life time exceeding 500 charge/discharge cycles. When the battery is charged at a 2C rate the life time drops to about 400 cycles. Using a 3C rate, typical of a quick charge, the life time would drop to about 100 cycles. It can be seen from this typical data that the charging rate can have a drastic impact on the life of the battery. Other charging parameters, such as charging voltage and allowed battery temperature also have a large effect, so it can be seen that a choice of battery charging profile can greatly change the user experience with the battery. In the case of charging voltage, the amount of energy that is stored in the battery can be increased by increasing the voltage at the expense of decreasing the battery life.

Exemplary embodiments of the present invention include charging methods and apparatuses for stand-alone battery chargers, battery powered devices with a battery to be charged, and wireless power transmitters for providing power to battery powered devices with a wireless-power receive antenna. Moreover, the battery powered devices may receive power from wireless power transmitters, AC sources, or DC sources. Much of the discussion herein focuses on stand-alone battery chargers and battery powered devices, with differences pointed out for wireless power transmitters where appropriate.

The history of user habits while charging the battery of a battery powered device may be used to enable the selection of a charging profile that can greatly extend the life of the battery while making the fully charged device available for daily use. Most conventional battery chargers use a compromise charging profile. This charging profile is a compromise between rapid charging, because the user's needs are unknown, and slow charging that is friendlier to the battery. Inexpensive wired chargers tend to be plugged and unplugged from power and have no sense of time or charging history. The battery powered device, such as a cell phone, itself may retain the charging history and select the optimum charging profile. For devices that do not have this feature built in, the charger can maintain the history and select the charging profile. Wireless chargers can take further advantage by adjusting the transmitted power to an optimum level for the selected charging profile and higher charging efficiency.

Traditional design for battery powered devices such as music players and cellular phones provided a battery that might last for several days of use, which the user would generally recharge every night. As a result, the battery would rarely experience a deep discharge cycle and would generally have a lifetime of multiple years. However, current smartphone designs with large color displays can often deplete the battery almost every day, requiring a full recharge, usually from a rapid charger. The rapid charging may be convenient for the user is some circumstances, but also may lead to a failure of the battery after much less than a year. Having a charging process that can take advantage of overnight (or other long duration) charging opportunities can greatly extend the life of the battery.

In an exemplary embodiment, a real time clock (RTC) may be automatically set from a network time source if the charger has network connectivity or from user input. The RTC keeps track of the determinable time event such as the time of day and can be used to determine different charging profiles for the battery based on the determinable time event such as the time of day. As a non-limiting example of one possible charging profile, when the user places the portable electron device on the charger in the evening, the charger can take all night to slow charge the battery, reducing heating of the battery and extending the battery life. The charger could also use a low power mode to accomplish this slow charging and reduce power consumption.

As a non-limiting example of another charging profile, if the user should place the device on the charger at noon, this is not the user's habit, and the battery charge is low, then the charger can assume that the battery needs a quick charge so a more aggressive charging profile could be used.

In some exemplary embodiments, the battery powered device 600 (FIG. 6) may control the battery charge power and maintain the RTC. In other exemplary embodiments, the wireless power receive circuitry 302 (FIG. 5) or the wireless power transmit circuitry 202 (FIG. 4) may control the battery charge power and maintain the RTC.

In one simple selection process, when the charger is connected to the phone after 6 PM and before 6 AM a nighttime charging profile may be selected, which may include a gentle slow charge to take advantage of the extended charging period. If the battery powered device were connected to the charger during the daytime period (e.g. between 6 AM and 6 PM), a fast charge profile may be selected to make the battery powered device available for use more quickly. This process may be improved by adding a user interface to change the charging profile start and stop times and/or allow a manual selection of the charging profile to accommodate special circumstances.

More generally, a charging profile for extending battery life may be defined to occur during a low activity time for the battery powered device and a charging profile for a fastest possible rate for charging may be defined at times associated with high activity for the battery powered device. These low activity times and high activity times are often referred to herein as nighttime and daytime, respectively, but may be defined as any times related to how the battery powered device is normally used.

Figure 8:
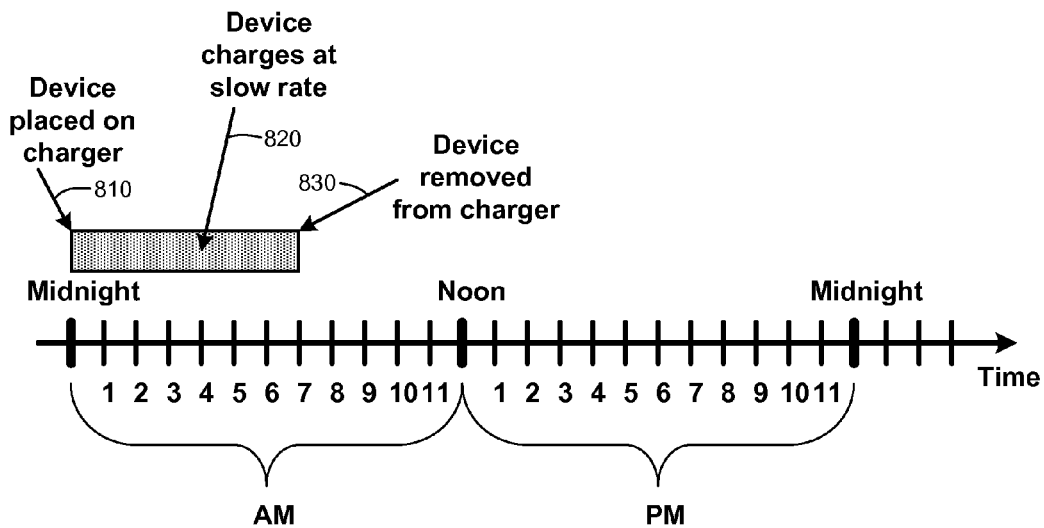
FIG. 8 is a time line showing a nighttime recharging session according to one or more exemplary embodiments of the present invention.

FIG. 8 is a time line showing a nighttime recharging session according to one or more exemplary embodiments of the present invention. In this example, the charging profile includes a charging start time that may be defined as a combination of during a low activity time and when the battery powered device is coupled (either wired or wirelessly) to a charging mechanism. Thus, the start time 810 is at midnight when the device is placed on the charger and the device is charged with a long charging duration 820 until a stop time 830, defined by a slow charging profile. This charging profile may be most beneficial to battery life.

Figure 9:
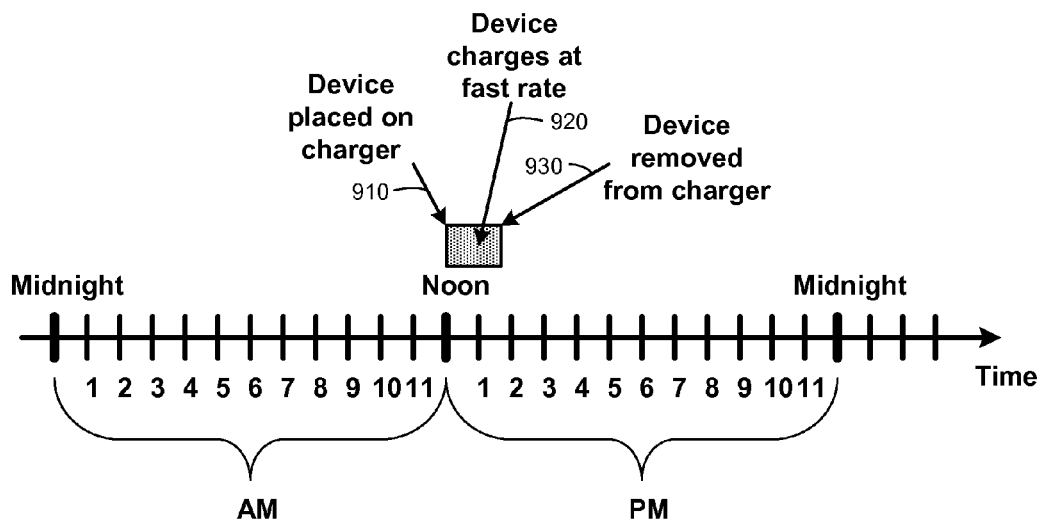
FIG. 9 is a time line showing a daytime recharging session according to one or more exemplary embodiments of the present invention.

FIG. 9 is a time line showing a daytime recharging session according to one or more exemplary embodiments of the present invention. In this example, the charging profile a start time may be defined as during a high activity time and when the battery powered device is coupled (either wired or wirelessly) to a charging mechanism. Thus, the start time 910 is at noon when the device is placed on the charger and the device is charged with a short charging duration 920 until a stop time 930, defined by a fast charging profile. This charging profile may impact battery life but makes the device available sooner for use.

Of course, usage habits of users may be vastly different from those defined in FIGS. 8 and 9. As a result, the low activity times and high activity times may be set by a user on a user interface on the device, or through communication channels, as explained above.

Some exemplary embodiments of the disclosure are directed to using history of charging to establish conditions of the battery and the knowledge of the habits of the user in order to charge the battery in the most efficient way. The life of the battery can be lengthened by taking advantage of the habit of the user to leave the device to be charged connected to the charger for an extended time during certain parts of the day. The device, the charger, or the wireless power transmitter uses this longer time to select a charging profile that stresses the battery less and uses less power. This helps make the wireless charger green (environmentally friendly) by extending the battery lifetime, reducing waste and using battery charging energy more efficiently. If the device is connected to the charger at a different determinable time event, such as a different time of day, then a quick charge profile is selected, resulting in a full charge sooner. It also provides a better user experience by producing a fully charged device ready when the user wants it.

In an exemplary embodiment, the battery powered device in memory 630, the battery charger such as the wireless power transmitter in a memory 270 would maintain a history of what determinable time event, such as a time of day, the device was in a configuration to be charged. This history would be used to refine the time periods for each charging profile. As a non-limiting example, if the user should attach the device to the charger at 6 PM, but then remove it at 7 PM, then the nighttime profile selection period (e.g., the low activity time) may be changed to 8 PM if history shows that the user rarely removes the device from the charger when it is attached to the charger after 8 PM. Similarly, if the device is habitually attached to the charger at 5 PM and rarely removed until the next morning, the nighttime charging profile period may be moved up to 5 PM. By recording the user's charging habits, the charging profile selection can be adjusted to take advantage of charging periods to charge at the lowest rate that fits in the period, yet still provide a fast charge profile when necessary to recover from a battery exhausted during the day.

Figure 10:
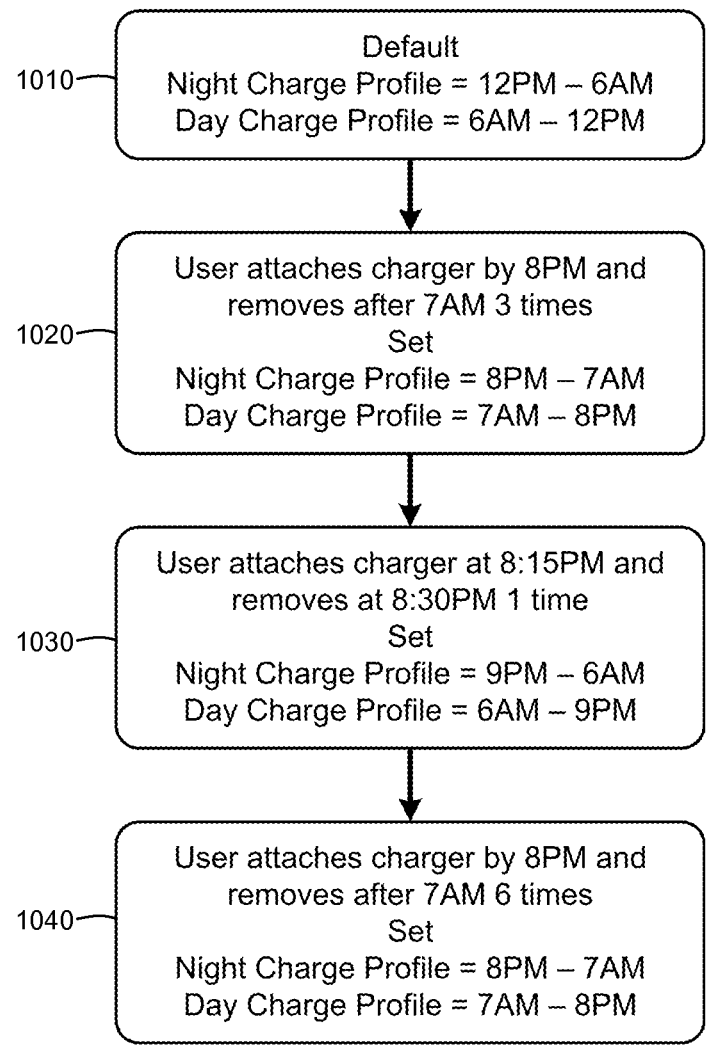
FIG. 10 is a simplified flow chart showing adaptation of charge profiles based on historical usage information.

FIG. 10 is a simplified flow chart showing adaptation of charge profiles based on historical usage information. As a non-limiting example, in operation 1010 a default is set for a night charge profile (e.g., a low activity time) of 12 PM to 6 AM.

In operation 1020 the device is set in a position to be charged at about 8 PM and removed at about 7 AM. After this pattern occurs 3 times (as an example) the low activity profile may be changed to 8 PM to 7 AM and the high activity profile may be changed from 7 AM to 8 PM.

In operation 1030 the device is set in a position to be charged at about 8:15 PM and removed after about 8:30 PM. After this pattern occurs 1 time (as an example) the low activity profile may be changed to 9 PM to 6 AM and the high activity profile may be changed from 6 AM to 9 PM.

In operation 1040 the device is set in a position to be charged by about 8 PM and removed by about 7 AM. After this pattern occurs 6 times (as an example) the low activity profile may be changed to 8 PM to 7 AM and the high activity profile may be changed from 7 AM to 8 PM.

Of course, these adaptations are some examples, many other times and adaptations may be used by exemplary embodiments of the disclosure. Furthermore, additional profiles may be defined. As non-limiting examples, intermediate profiles may be defined between anticipated low activity times and high activity times. An intermediate profile between a high activity time and a low activity time may start out charging the device with a fast charging profile, then switch to a lower charging profile if the device is left in a position to be charged for a predetermined amount of time.

In some exemplary embodiments, the charger (e.g., a wireless power transmitter) will control the charging profile. In this case the charger may use a communications interface to the battery powered device to at least identify the device with an identifier. The charger would take advantage of the communication with the device being charged to identify that device, the battery, the type of battery, or combinations thereof. The charger would have an RTC to aid in recording the times when the device to be charged is attached to the charger and when it is removed. The charger may maintain the charging profiles for the specific device and use the RTC to select the appropriate charging profile based on the determinable time event such as the time of day. In addition, the charger may maintain device charging histories for various devices associated therewith and adaptively select an appropriate charging profile based on the charging history and the determinable time event such as the time of day, as explained above.

Furthermore, the charging profile may be based on a default determinable time event, such as a time of day, or may be set by the user via a user interface on the charger or on the device to be charged. In the case of using the user interface on the device, the settings may be transferred to the charger via the communications interface.

In the adaptive forms of charging, the history of start and stop times for charging would be recorded. As a history of the habits of the user is built up, the charger would shift from the default charging selection schedule to a schedule where it would select from a plurality of profiles that takes advantage of the time the user leaves the device on the charger. This adaptation would follow the same steps as outlined above for the device controlled charging profile selection.

In another exemplary embodiment, a wireless battery charger would communicate via a wireless communications link with the device to be charged to identify the device and the battery installed in the device. The strength of the field of radio waves would be adjusted for the appropriate charging power for the device. Devices with very small batteries would benefit from being identified as such because even the weak field charging rate in the simple example immediately above may still result in a charge rate too rapid for the small battery. In this case the identification of the device would result in the wireless charger selecting an even weaker field of radio waves to further reduce power consumption and impact on the battery being charged.

Figure 11:
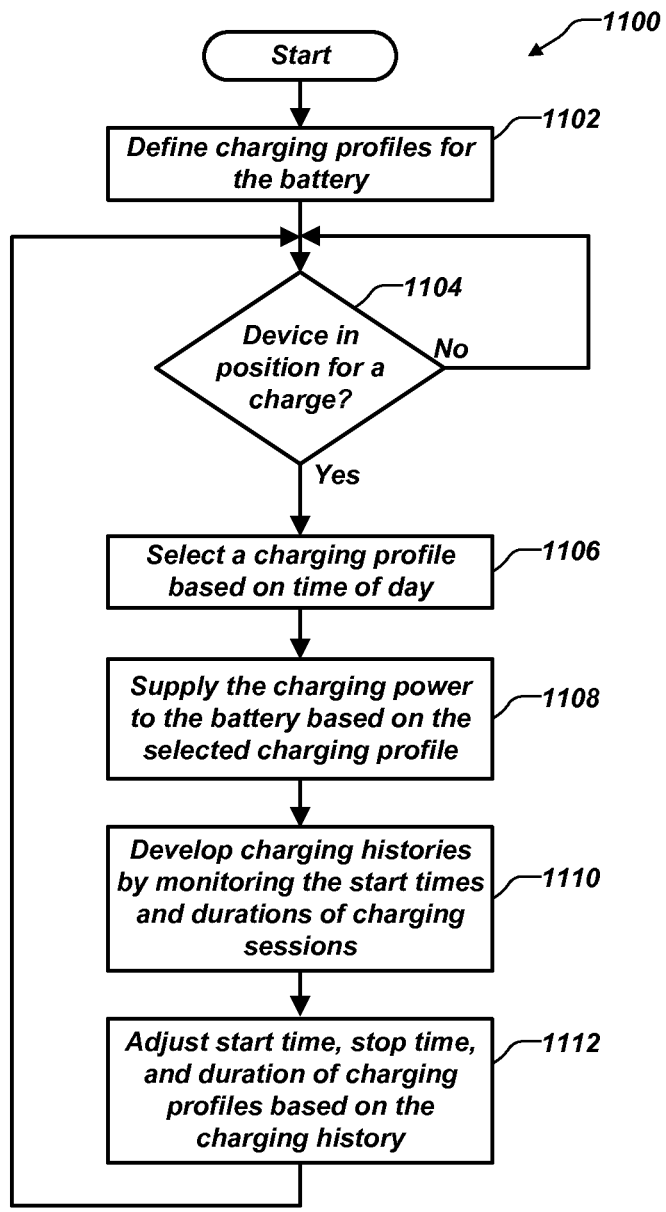
FIG. 11 is a flow chart illustrating exemplary embodiments of a process for defining, selecting, and refining charge profiles.

FIG. 11 is a flow chart illustrating exemplary embodiments of a process 1100 for defining, selecting, and refining charge profiles. In operation block 1102 various charging profiles for the battery may be defined. Decision block 1104 tests to see if the device to be charged is in a position for charging. If, not, the process 1100 loops until the device is in a position to be charged.

In operation block 1106, a charging profile is selected based on the determinable time event, such as the time of day. In operation block 1108, charging power is provided to the battery based on the selected charging profile. In operation block 1110, charging histories are developed by monitoring at least the start time and the duration of the current charging session. Other parameters may also be monitored and maintained with the charging history, such as, for example, stop times, and power delivery parameters.

In operation block 1112, parameters of the charging profile, such as, for example, start time, stop time, and duration may be modified based on the current, and possibly previous charging histories. After completion of a charging session, the process 1110 loops to decision block 1104 to wait for a new charging session.

In the examples discussed above, the number of devices to receive battery charging power is not limited to one. Multiple devices may be charged at the same time or in rotation while the charging profile for each device is selected based on a determinable time event, such as a time of day, the charging habit history of that device, or a combination thereof.

In the examples discussed above, the selection criteria may be altered manually via a user interface. The user interface may be on the device being charged or on the battery charger. A second device in communication with the battery charger may also provide the user interface function. The user interface may also be provided by a Web page on the Internet, connected to the device being charged, another device in communication with the battery charger, or directly with the battery charger.

By charging battery powered devices in an adaptive way, the life of the battery may be extended while still accommodating the user's needs with an occasional quick charge when time does not allow the normal slow charge profile. In many exemplary embodiments, no user interaction is required as the charger can record the user's habits and build a history of charging start and stop times and the charge duration for the battery.

Some exemplary embodiments of the disclosure may use additional information, such as motion information from motion sensors and position information from a GPS receiver to adaptively tune the charging profiles and maintain additional device charging history.

In addition, some exemplary embodiments may perform additional functions during low activity times, when the battery powered device is normally not being used. This adaptation may define times for some tasks so they do not have to be performed; a) by the user, or b) by the system during a time the user is using the device for other tasks and does not wish to have any additional processes slowing down the system.

Some of these tasks are outlined below. A battery powered device's information content may be backed up to the chargers internal storage. This process may be helpful because it takes advantage of something that users do already, namely connect the battery powered device to a charger. The process uses the charging time as an opportunity to perform a backup operation.

Another process that may be performed during low activity times is downloading content from an external data network (such as the Internet) so the user has instant access to the content the following day. Examples may include downloading the top 50 most popular social networking videos uploaded during the day, and preparing them for viewing. Furthermore, any necessary trans-coding (e.g., HD mpeg4→VGA packet video) may be performed during low activity times.

Other processes that may be performed during low activity times are to upload any pictures and videos captured during the day on the battery powered device to a favorite Internet portal or other remote device or remote location. In some exemplary embodiments, chargers for battery powered devices include internal storage and may be configured to run a Web server through an external data network enabling the user to access backed up content at any time using a Web browser.

System maintenance, such as, for example, flash memory defragmentation and memory cleanup operations may be performed during low activity times. Reports may be generated to be read in the morning, which may include: miles walked, steps taken, hours of music listened to, and at what average and peak dB to help minimize hearing loss, appointments missed, calls not returned, messages not replied to, etc.

Figure 12:
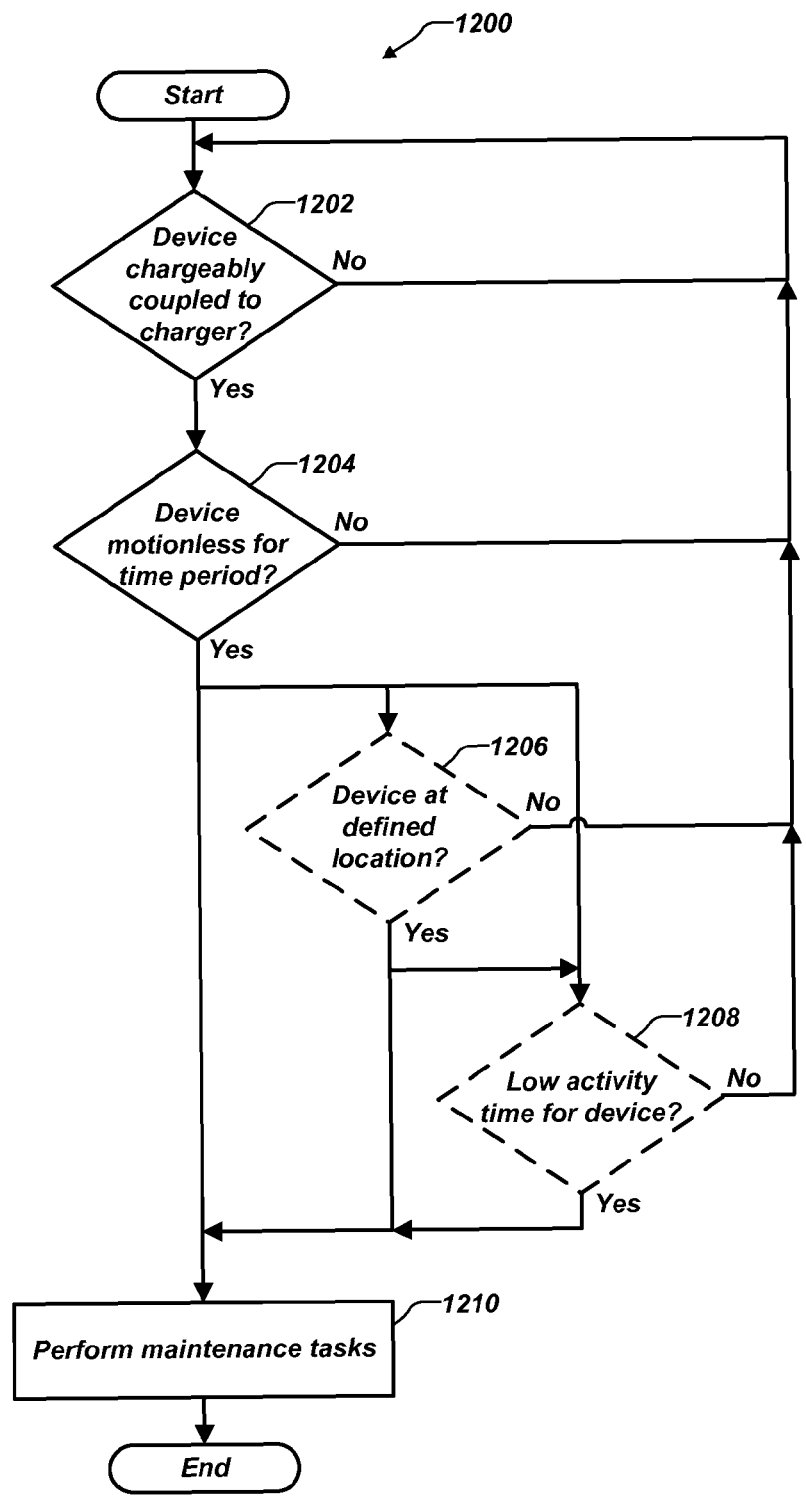
FIG. 12 is a flow chart illustrating additional exemplary embodiments of a process for performing device maintenance tasks.

FIG. 12 is a flow chart illustrating additional exemplary embodiments of a process 1200 for performing device maintenance tasks. As non-limiting examples, some of these maintenance tasks may be as defined above such as: backing up internal storage contents of the battery powered device to the battery charger; downloading media content from the Internet to the battery powered device, the battery charger, or a combination thereof; uploading media content captured by the battery powered device to the battery charger; and performing memory cleanup, memory defragmentation, or a combination thereof on the battery powered device.

In decision block 1202, the process determines if the battery powered device is chargeably coupled to a battery charged equipped to perform or assist in the performance of maintenance tasks for the battery powered device, the battery charger, or a combination thereof. If the battery powered device is not chargeably coupled the process loops back to wait until it is chargeable coupled.

In decision block 1204, the process determines if the battery powered device has remained substantially motionless for a predetermined amount of time since it was chargeably coupled. This amount of time may be set as a default value (e.g., two hours), which may be modified by the user through a user interface on the battery powered device or the battery charger. Thus, if the motion sensors on the battery powered device indicate little or no motion for the defined time period, this test would be satisfied. This test may capture a long time period where the user is not likely to use the battery powered device, such as, for example, while the user is sleeping. If the time period of little or no motion has not been met, the process loops back to decision block 1202.

In some exemplary embodiments, if the time period of little or no motion has been met, operation 1210 indicates that the battery powered device and battery charger begin performing the maintenance tasks and the process completes.

In some exemplary embodiments, if the time period of little or no motion has been met, decision block 1206 is performed to determine if the device is at a predefined physical location. Decision 1206 may use GPS location functions on the battery to determine that the battery powered device is in a physical location normally associated with a time when the battery powered device is less likely to be used, such as, for example, at home on a wireless charging stand. One or more such physical locations may be set by the user through a user interface or adaptively determined by the battery powered device based on repeated determinations of the decisions in decision blocks 1202, 1204, and 1208. If the battery powered device is not at the defined location, the process loop back to decision block 1202. If decision block 1206 evaluates true, the maintenance tasks are performed at operation 1210 and the process completes.

In some exemplary embodiments, decision block 1208 may be included to determine a low activity time or other detectable condition for the battery powered device. A low activity time condition may be determined as discussed above in the development of charging profiles. Other detectable conditions may include, but are not limited to, one or more other condition sensors 645 such as an ambient light detector. An ambient light detector may be used to determine user inactivity such as during sleeping in a darkened space where, for example, the ambient light may be at a level of <20 lux.

If it is not a low activity time or other detectable condition for the battery powered device, the process loop back-to-decision block 1202. If decision block 1208 evaluates true, the maintenance tasks are performed at operation 1210 and the process completes. In some exemplary embodiments, decision block 1208 may be used and decision block 1206 may be by passed.

In some exemplary embodiments, a battery powered device may be serialized (i.e., configured to only work with specific chargers based on a serial number or other charger identifier), which allows the user an option to enable a feature whereby the user's device will only charge with a specific set of chargers (e.g., the charger on the nightstand, in the office, and in the car). This serialization may deter theft of these battery powered devices. The system may operate over a communication channel whereby the two devices may be synchronized with a handshaking mechanism before charging could begin. Individuals would likely return a stolen or found battery powered device to an owner given they will be unable to use the device if it is only serialized to particular chargers.

Moreover, the serialization may be used as a security process. As a non-limiting example, smart phones perform many tasks beyond performing voice calls. Even if a smart phone is stolen or misplaced and the user cancels the voice and data services for the smart phone, it may still be able to perform many applications and even communicate over other wireless networks. With the serialization, once the battery in the battery powered device is depleted, the battery powered device will no longer operate unless it is charged by an authorized charger.

An authorized charger list may be maintained on the battery powered device to indicate which chargers are allowed to provide power to the device. If the battery powered device is chargeably coupled to a battery charger on the authorized charger list, the battery powered device may be enabled to operate, charge, or a combination thereof. If the battery powered device is chargeably coupled to a battery charger not on the authorized charger list, the battery powered device may be disabled from operation, from charging, or a combination thereof.

In some exemplary embodiments, the charger can connect to an external network over a wireless communication channel and an included GPS module would enable users to share chargers. For example, the next time a user is running low on power and needs to charge the battery powered device, the user can connect to a service that will inform the user of a location and owner for the closest available charger. Although GPS is not accurate enough to help find the exact location of the charger, it can inform a user who works in a building that a charger for the user's battery powered device may be nearby and available to rent or borrow.

A charger sharing database may be defined that is accessible from a communication network, such as, for example, the Internet. Users who wish to participate in the charger sharing may register their charger with the database to indicate a location of the charger and the charger type. In some embodiments, the charger location may be periodically updated through manual entry by the user or through automatic means based on GPS information from the charger. A user wishing to find an available charger can access the charger sharing database from the battery powered device through the communication network to determine charger locations and charger types for compatible chargers near the user's current location based on GPS information from the user's battery powered device.

Figure 13A:
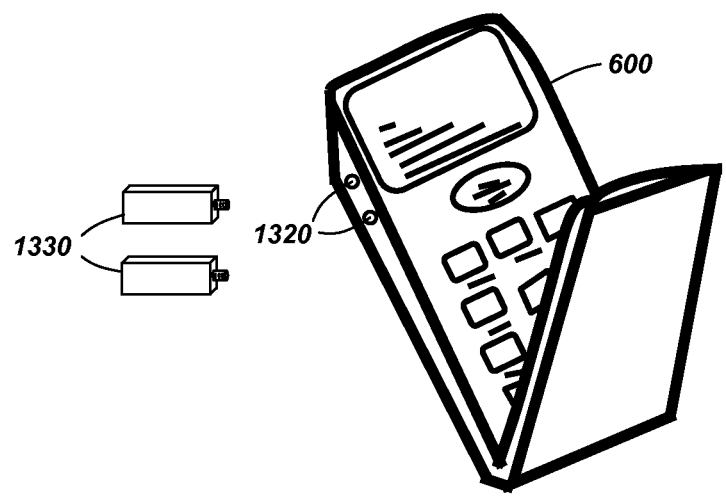
FIG. 13A illustrates a battery powered device including attachable tabs for Alternating Current (AC) charging.

FIG. 13A illustrates a battery powered device 600 including attachable tabs 1330 for Alternating Current (AC) charging. Tab receptacles 1320 may be provided and positioned on the battery powered device 600 such that when the attachable tabs 1330 are attached thereto, electrical and mechanical coupling occurs such that the battery powered device 600 may be plugged into an AC outlet for charging. The mechanical coupling may be a coupling means, such as, for example, a secure press fit, a threaded fit, a key lock, or other suitable mechanism. As part of the mechanical coupling, the attachable tabs are also connected to an AC-DC converter, to provide charging power to the battery.

Figure 13B:
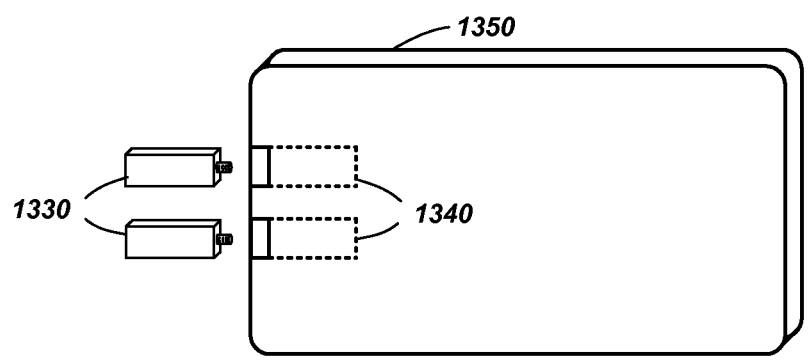
FIG. 13B illustrates the attachable tabs of FIG. 13A and a tab storage device for receiving the attachable tabs.

FIG. 13B illustrates the attachable tabs 1330 of FIG. 13A and a tab storage device 1350 for receiving the attachable tabs 1330. Thus, the attachable tabs 1330 may be stored flat, in a credit card size casing that can easily fit in a wallet or other compact location.

In some exemplary embodiments, retail outlets may have a program whereby they replace a customer's empty battery with a fully charged battery. A user may be willing to give up his battery only if the battery the user gets in return has the same or fewer charge cycles. In other words, a user would not want to give up a new battery for one that has been recharged 3,000 times. To that end, some exemplary embodiments may include a counter that designates how many times a battery has been charged. In addition, a retail clerk could use a date stamp on the battery to provide a battery from an earlier date or a battery with fewer recharge cycles.

Thus, a battery exchange service may be established at retail outlets for the convenience of their customers. A battery charger for the battery exchange service could be equipped to estimate a battery life based on one or more of the scenarios discussed above, such as, for example, number of charge cycles the battery has undergone, date stamp on the battery, and battery charging history using embodiments of the invention discussed above. The retailer may give the customer a supplied battery that has the same or longer estimate of battery life than an estimate of battery life for a returned battery.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a Website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly charging a battery powered device, comprising:
   an antenna configured to transmit wireless power; and
   a processor operably coupled to the antenna and configured to:
      collect a charging history of the battery powered device, the charging history comprising at least one stored charging start time and at least one stored charging stop time, the at least one stored charging start time comprising a first time when the battery powered device is placed within a charging area of the apparatus;
      generate at least one of a plurality of charging profiles based at least in part on the charging history;
      determine a presence detected time at which a presence of the battery powered device is detected within the charging area of the apparatus; and
      select a charging profile from the plurality of charging profiles based on a determination that a charging start time of the battery powered device corresponds to a stored charging start time of the selected charging profile, the charging start time corresponding to the determined presence detected time.

2. The apparatus of claim 1, wherein the at least one charging stop time comprises a second time when the battery powered device is removed from the charging area of the apparatus.

3. The apparatus of claim 1, wherein each of the plurality of charging profiles comprises at least one of a different charging rate, a different current, or a different voltage than each other charging profile of the plurality of charging profiles.

4. The apparatus of claim 1, further comprising a memory, wherein the processor is further configured to store the collected charging history in the memory.

5. The apparatus of claim 1, further comprising a real time clock (RTC), wherein the processor is operably coupled to the real time clock and configured to determine times via the real time clock.

6. The apparatus of claim 1, wherein the charging history comprises a plurality of charging start times and a corresponding plurality of charging stop times or charging durations, wherein each charging start time is paired with its corresponding charging stop time or charging duration in the charging history.

7. The apparatus of claim 6, further comprising a memory and wherein the processor is further configured to:
   determine a pattern based on the history of charging;
   modify at least one of the plurality of charging profiles based on the determined pattern; and
   store the determined pattern and the modified plurality of charging profiles in the memory.

8. The apparatus of claim 1, wherein the processor is further configured to update at least one of the plurality of charging profiles based on a determined pattern of additional history of charging.

9. The apparatus of claim 1, further comprising a user interface operably coupled to the processor, wherein the processor is further configured to process input from a user on the user interface.

10. The apparatus of claim 9, wherein at least one of the charging start time or the charging stop time for at least one charging profile of the plurality of charging profiles is modified or set by the user of the apparatus.

11. The apparatus of claim 1, further comprising a communication element to receive an identifier for the battery powered device, wherein the processor is operably coupled to the communication element and configured to associate the identifier with the charging history of the battery powered device.

12. A method for wirelessly charging a battery powered device, comprising:
   collecting a charging history of the battery powered device, the charging history identifying at least one stored charging start time and at least one stored charging stop time, the at least one stored charging start time comprising a first time when the battery powered device is placed within a charging area of the apparatus;
   generating at least one of a plurality of charging profiles based at least in part on the charging history;
   detecting a presence of the battery powered device within the charging area; and
   selecting a charging profile from the plurality of charging profiles based on determining that a charging start time of the battery powered device corresponds to a stored charging start time of the selected charging profile.

13. The method of claim 12, wherein the at least one charging stop time comprises a second time when the battery powered device is removed from the charging area.

14. The method of claim 12, wherein each of the plurality of charging profiles comprises at least one of a different charging rate, a different current, or a different voltage than each other charging profile of the plurality of charging profiles.

15. The method of claim 12, further comprising storing the collected charging history in a memory.

16. The method of claim 12, further comprising determining times via a real time clock (RTC).

17. The method of claim 12, wherein the charging history comprises a plurality of charging start times and a corresponding plurality of charging stop times or charging durations, wherein each charging start time is paired with its corresponding charging stop time or charging duration in the charging history.

18. The method of claim 17, further comprising:
determining a pattern based on the history of charging;
modifying at least one of the plurality of charging profiles based on the determined pattern; and
storing the determined pattern and the at least one modified profile in a memory.

19. The method of claim 12, further comprising updating at least one of the plurality of charging profiles based on a determined pattern of additional history of charging.

20. The method of claim 12, further comprising processing input from a user on a user interface.

21. The method of claim 20, wherein at least one of the charging start time or the charging stop time for at least one charging profile of the plurality of charging profiles is modified or set by the user.

22. The method of claim 12, further comprising receiving an identifier for the battery powered device and associating the identifier with at least one charging profile of the plurality of charging profiles.

23. An apparatus for wirelessly charging a battery powered device, comprising:
means for collecting a charging history of the battery powered device, the charging history comprising at least one stored charging start time and at least one stored charging stop time, the at least one stored charging start time comprising a first time when the battery powered device is placed within a charging area of the apparatus;
means for generating at least one of a plurality of charging profiles based at least in part on the charging history;
means for detecting a presence of the battery powered device within the charging area; and
means for selecting a charging profile from the plurality of charging profiles based on determining that a charging start time of the battery powered device corresponds to a stored charging start time of the selected charging profile.

24. The apparatus of claim 23, wherein the at least one charging stop time comprises a second time when the battery powered device is removed from the charging area.

25. The apparatus of claim 23, wherein each of the plurality of charging profiles comprises at least one of a different charging rate, a different current, or a different voltage than each other charging profile of the plurality of charging profiles.

26. The apparatus of claim 23, further comprising means for storing the collected charging history in a memory.

27. The apparatus of claim 23, wherein the charging history comprises a plurality of charging start times and a corresponding plurality of charging stop times or charging durations, wherein each charging start time is paired with its corresponding charging stop time or charging duration in the charging history.

28. The apparatus of claim 23, further comprising:
means for determining a pattern based on the history of charging;
means for modifying at least one of the plurality of charging profiles based on the determined pattern; and
means for storing the determined pattern and the at least one modified profile in a memory.

29. The apparatus of claim 23, further comprising means for updating at least one of the plurality of charging profiles based on a determined pattern of additional history of charging.

30. The apparatus of claim 23, further comprising means for processing input from a user on a user interface.

31. The apparatus of claim 30, wherein at least one of the charging start time or the charging stop time for at least one charging profile of the plurality of charging profiles is modified or set by the user.

32. The apparatus of claim 23, further comprising means for receiving an identifier from the battery powered device and means for associating the identifier with at least one charging profile of the plurality of charging profiles.

* * * * *